Figure 1:
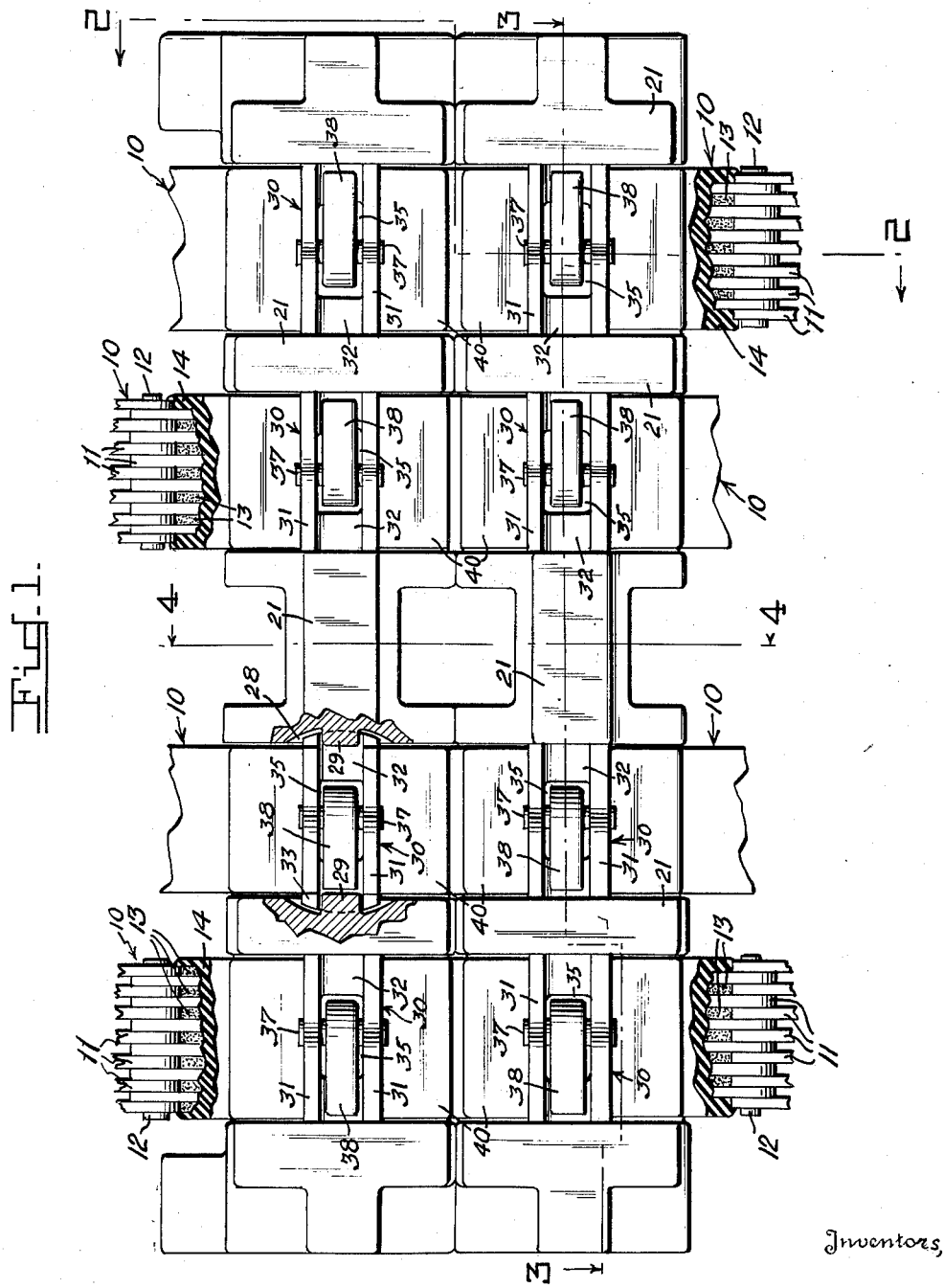

July 25, 1950  P. G. HAGENBUCH ET AL  2,516,115
ENDLESS BAND TRACK
Filed Aug. 5, 1947  3 Sheets-Sheet 1

Inventors,
Paul G. Hagenbuch
Raymond I. Strickland
By J. H. Church + W. E. Thibodeau
Attorneys July 25, 1950 P. G. HAGENBUCH ET AL 2,516,115
ENDLESS BAND TRACK
Filed Aug. 5, 1947 3 Sheets-Sheet 2
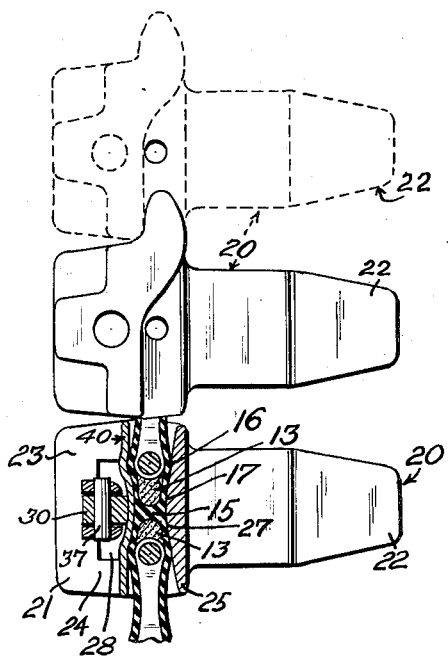
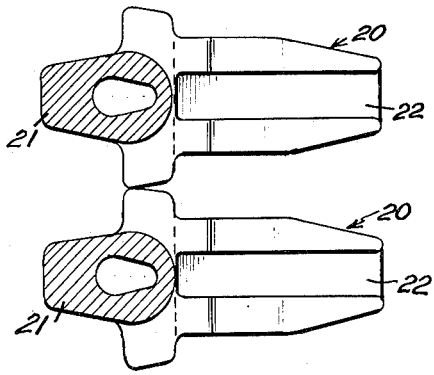
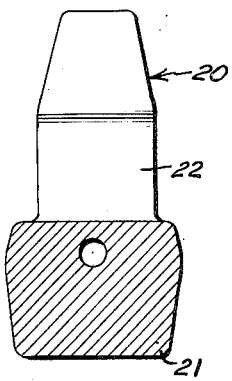
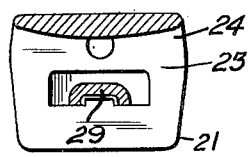
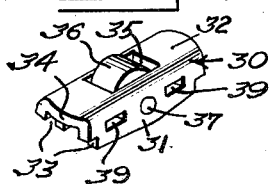
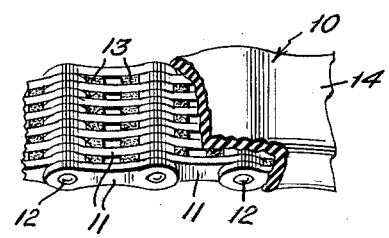
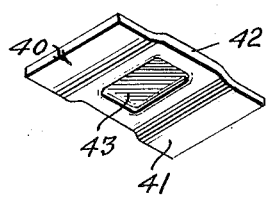
Inventors
Paul G. Hagenbuch
Raymond I. Strickland
By J. H. Church + W. E. Thibodeau
Attorneys

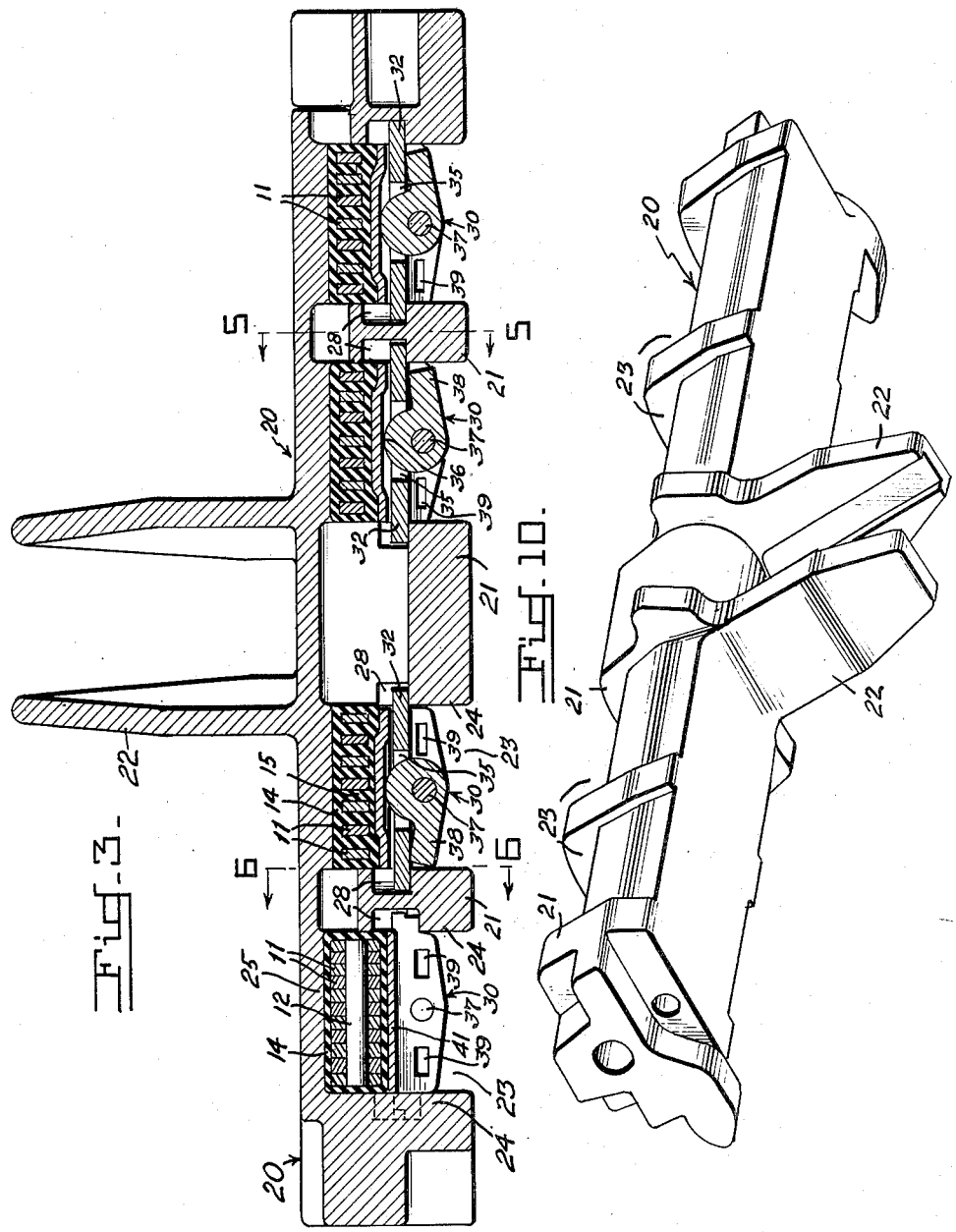

Patented July 25, 1950

2,516,115

UNITED STATES PATENT OFFICE 2,516,115

ENDLESS BAND TRACK

Paul G. Hagenbuch, Arlington, Va., and
Raymond I. Strickland, Greenbelt, Md.

Application August 5, 1947, Serial No. 766,432

16 Claims. (Cl. 305—10)

(Granted under the act of March 3, 1883, as amended April 30, 1928; 370 O. G. 757)

The invention described herein may be manufactured and used by or for the Government for governmental purposes without the payment of any royalty thereon.

Our invention relates to endless tracks for track laying vehicles and more particularly to tracks comprising one or more flexible bands having reinforcing means imbedded therein and having track shoes demountably attached thereto.

In the past such tracks have been formed of rubber or like materials with endless steel cables imbedded therein lengthwise thereof as the reinforcing means. Such structures are objectionable in that the flexing and stretching of the cables which occurs in normal use soon results in the failure of one or more cables and necessitates replacement of the entire track. The same objection is true where track shoes or track guides are formed integral with the track.

With the foregoing in view, it is an object of the invention to provide an improved track for a track laying vehicle.

A further object is to provide such a track which comprises an endless flexible band having molded therein one or more endless chains extending longitudinally thereof to reinforce the same.

A further object is to provide an endless flexible track having one or more endless chains imbedded therein as aforesaid to reinforce the track and wherein lubrication means are sealed in the track to lubricate the connections of the individual links of the chain.

A further object is to provide a novel combination of an endless track and detachable track shoes therefor.

A further object is to provide a novel combination with an endless track of means for detachably connecting track shoes thereto.

A further object is to provide a novel combination of an endless track, track shoes therefor and means for detachably connecting said shoes to said track.

A further object is to provide a novel track shoe for a track laying vehicle.

A further object is to provide novel means for detachably connecting a track shoe to the track of a track laying vehicle.

A further object is to provide a novel combination of a track shoe and means for detachably connecting the same to the track of a track laying vehicle.

Other objects and advantages reside in the particular structure of our invention, combination and arrangement of the several parts and in the particular methods or modes of operation, construction or assembly, all of which will be readily apparent to those skilled in the art upon reference to the drawing and specification wherein the invention is shown, described and claimed.

In the drawings:

Figure 1 is a fragmentary, bottom plan view of the lower run of an endless track according to the invention, Figure 2 is a side elevation thereof with parts being shown in longitudinal vertical section substantially on the plane of the line 2—2, Figure 1, Figure 3 is a transverse, vertical section of the lower run of track taken substantially on the plane of the line 3—3 of Figure 1, the section then being rotated through 180° to position the bottom of the tread downward, Figure 4 is a longitudinal, vertical section taken substantially on the plane of the line 4—4 of Figure 1 and with non-essential background parts omitted, Figure 5 is a longitudinal, vertical section taken substantially on the plane of the line 5—5 of Figure 3, Figure 6 is a like view but taken on the plane of the line 6—6 of Figure 3, Figure 7 is a perspective view of one of the clamps for attaching the track shoe to the track apart from the related structure, Figure 8 is a like view of a related element, Figure 9 is a fragmentary, perspective view of one of the bands forming the track with portions broken away, and Figure 10 is a perspective view of the track shoe.

Referring specifically to the drawing, wherein like reference characters have been used throughout to designate like parts, 10 designates generally a track band for the track of a track laying vehicle. The band 10 comprises a core which may be formed of a multiple, flat link chain which may be composed of a plurality of flat, plate-like links 11 connected together at their ends by any suitable joint forming means as the hinge pins 12 which extend transversely through the ends thereof.

The band 10 may be of any suitable width depending upon the number of links 11 which are arranged side by side. Any suitable link 11 and joint member 12 may be used to provide a multi-jointed core having inflexible portions intermediate the joints.

The spaces between the links 11 in at least the areas adjacent the joint members 12, are packed with any suitable lubricant 13. The lubricant 13 is preferably of a pastelike consistency and a graphite paste is particularly suitable.

The core of the band 10 is covered by a flexible, rubber-like cover or sheath 14 which seals therein the core and the lubricant 13. As is clearly apparent in Figures 2 and 9, portions 15 of the sheath material 14 extend into the spaces between the links 11 to surround the lubricant and form lubricant reservoirs. The top and bottom walls of each reservoir are formed of sheath material and one end wall is formed by a portion 15 of such material. The side walls of each reservoir are formed by adjacent links 11 and the other end wall is formed by an overlapping end of an adjacent link 11 and by a joint member 12. The function of this structure of the reservoirs will be described later.

As is shown in Figure 2, the upper and lower surfaces of the band 10 are not plane but comprises regularly spaced transverse ridges 16 over the joints which merge into valleys 17 in the inflexible portions of the band.

The track shoes 20 may be of any suitable form having any suitable grouser 21 on the lower surface and any suitable sprocket guides 22 on the upper surface. One or more channels 23 are formed in each shoe 20 to receive one or more track bands 10. The channels 23 comprise side walls 24 and an intermediate connecting wall portion 25. The intermediate portion 25 (Figs. 2 and 6) is convex in section to provide a ridge 27 and is complementary to a valley portion 17 of one surface of the band 10 between two adjacent ridges 16. The structure not only enables the shoes 20 to be regularly spaced around the bands 10 with a minimum of delay but also insures the location of each shoe between two adjacent joints of the bands 10 whereby the full flexibility of the latter is maintained.

The side walls 24 of the channels 23 are formed with oppositely disposed recesses 28 which may be arcuate in plan (Fig. 1). The floors of such recesses 28 are formed with centrally disposed bosses 29, the purpose of which will be described hereafter. As is best shown in Figure 3, the recesses 28 are located just below the bands 10 when the latter are seated against the intermediate wall portions 25 of the shoe.

A clamp 30 is provided for each channel 23 of each shoe 20 and in the form shown (Figs. 1, 2, 3 and 7) comprises an inverted U-shaped channel member having flanges 31 and a web 32. The free corners of the flanges 31 may be cut away to form notches 33 and the ends of the web 32 may be rounded as at 34 to be complementary to the arcuate walls of the recesses 28.

The web 32 is formed with an opening 35 therethrough through which extends the working surface of a cam 36 which is pivoted as at 37 between the flanges 31 of the clamp. The cam 36 has an integral actuating arm or lever 38, whereby the cam may be partially rotated from the operative position, Figs. 3 and 7, 180° in a counterclockwise direction to an inoperative position (not shown) and vice versa. The flanges 31 are formed with a plurality of pry slots 39 through which any suitable tool (not shown) is insertable to initiate movement of the lever 38 in either an operative or an inoperative direction.

A pressure plate or band guard 40 is insertable in each channel 23 between the clamp 30 and the band 10. The plate 40 is of any suitable shape and is substantially concavo-convex in cross section. The convex surface 42 is formed to be complementary to the valley portion 17 of the band 10. The concave surface of the plate 40 provides an indentation 43 to receive the working surface of the cam 36.

To assemble a shoe 20 on a band 10, the latter is seated in a channel 23 against the wall portion 25 with the convex or ridge portion 27 nesting in a complementary valley portion 17 of the band. A clamp 30 is now positioned in the channel 23 lengthwise thereof. The clamp is now rotated 90° in a horizontal plane to the final position. The notched corners of the flanges 31 are lifted over the bosses 29 of the recesses 28. In this connection, Fig. 6 clearly shows that the recesses 28 are of sufficient height to permit this movement. The notches 33 provide sufficient flange surface within the recesses 28 to prevent accidental reverse swinging of the clamp while the vertical portions of the notches 33 are positioned closely adjacent the side walls 24 below the recesses 28 and prevent accidental dislodgement of the clamp by endwise movement. The cam 36 is in the inoperative position throughout this operation.

The pressure plate 40 is now inserted in the channel 23 lengthwise thereof between the clamp 30 and the band 10. The ridge 42 of the plate 40 nests in a valley 17 of the band opposite to that seating the ridge 27 of the wall portion 25 of the channel.

The lever 38 of the cam 36 is now swung manually in a clockwise direction as far as possible and hammered or otherwise forced the remaining distance to the operative position shown in Figs. 2, 3 and 7 which is beyond the dead center of the cam.

In such operative position the combined opposed pressure of the ridge portions 27 and 42 of the channel and plate respectively compresses the sheath material 14, including the portion 15 thereof whereby to exert a joint lubricating pressure on the lubricant 13 in the particular reservoirs involved. In this manner all joints of the band 10 are pressure-lubricated at all times when in use and wear of the joint posts is thereby reduced to a minimum.

While we have shown and described what is now thought to be a preferred embodiment of the invention, it is obvious that the same is susceptible of other forms and expressions. Consequently, we do not limit ourselves to the precise structures, combinations and sub-combinations shown and described herein except as hereinafter claimed.

We claim:

1. In combination, a band for an endless flexible track for a track laying vehicle comprising a chain formed of a plurality of flat sheet metal links, each link being hingedly connected at each end to adjacent links to provide a plurality of flexible joints with interposed inflexible positions, lubricant for said joints, a flexible rubber-like covering surrounding said chain and sealing in said lubricant, a plurality of track shoes for said band, each of said shoes having a portion formed for engagement with said band at one side of one of said inflexible portions of said chain, and means attachable to said shoes and having a clamp adapted to bear against said band at the opposite side of said inflexible portion to maintain said shoes in position on said band while simultaneously exerting a lubricating pressure on said lubricant.

2. In combination, a band for an endless flexible track for a track laying vehicle comprising a chain formed of a plurality of flat sheet metal links, each link being hingedly connected at each end to adjacent links to provide a plurality of flexible joints with interposed inflexible portions, lubricant for said joints, a flexible rubber-like covering surrounding said chain and sealing in said lubricant, a plurality of track shoes for said band, and means for securing said shoes to said band at an inflexible portion thereof and simultaneously maintaining a lubricating pressure on said lubricant.

3. In combination, a flexible endless band for a track for track laying vehicles, at least one endless reinforcing member inclosed in said band lengthwise thereof and comprising a plurality of inflexible members connected together by flexible joints, said band comprising a sheath sealing a lubricant in contact with each joint of said reinforcing member to lubricate said joints.

4. The combination of claim 3, a plurality of track shoes for said band, securing means for securing said shoes to said band at points intermediate the joints of the inflexible members, said means cooperating with said shoes to exert a lubricating pressure on the lubricant for the adjacent joints of said reinforcing member.

5. A flexible tension member comprising a core formed of a plurality of substantially inflexible members, means connecting said members together in end to end relation to provide flexible joints, a sheath composed of flexible material sealed around said core, and reservoirs of lubricant sealed within said sheath, there being a reservoir of lubricant in lubricating contact with each joint of said core.

6. A flexible tension member comprising a core formed of a plurality of substantially inflexible members, means connecting said members together in end to end relation to provide flexible joints, a sheath composed of flexible material sealed around said core and a supply of lubricant sealed within said sheath and adapted to lubricate each joint of said core.

7. The structure of claim 5, said reservoirs being at least partially formed of said flexible material of said sheath.

8. A flexible tension member comprising a core formed of a plurality of substantially inflexible members means connecting said members together in end to end relation to provide flexible joints, a sheath composed of flexible material sealed around said core, and reservoirs of lubricant sealed within said sheath for lubricating each joint of said core, said reservoirs each being compressible to exert lubricating pressure on the lubricant contained therein.

9. In combination, a track shoe for the track band of a track laying vehicle, comprising a ground engaging portion, at least one track band receiving channel in said portion, said channel having a top wall and opposed side walls, a laterally extending recess in each of said side walls below said top wall, and a track band clamp, said clamp comprising rigid portions adapted to be seated in said lateral recesses and a movable clamp member engageable with said band to clamp the same between said member and the top wall of said channel.

10. The structure of claim 9, said recesses being substantially arcuate in plan, and said clamp being removable therefrom upon partial rotation in the plane of said recesses.

11. The structure of claim 9, said clamp member comprising a single throw lever having an integral cam operative to clamp said band.

12. In combination, a track shoe for the track band of a track laying vehicle, said shoe, including a ground engaging portion, said portion being formed to provide at least one track band receiving channel therein, said channel having a closed top wall and opposed side walls, a track band receivable in said channel, said channel including means for detachably mounting a band clamp therein, a band clamp mountable on said means, and a pressure plate insertable in said channel between said clamps and said band.

13. The structure of claim 12, said band having upper and lower surfaces formed to provide substantially regular depressions therein, said top wall of said channel and a surface of said pressure plate being formed to provide ridges complementary to the depressions in said band to facilitate proper location of said shoe on said band.

14. The structure of claim 12, and complementary inter-engaging portions formed on said top wall of said channel, said band and said pressure plate.

15. A clamp for clamping a track shoe to the track band of a track laying vehicle, comprising an inverted U-shaped channel member, a clamping cam pivoted between the flanges of said channel, an operating arm integral with said cam, and said flanges of said member being formed to provide lateral pry slots therethrough to permit actuation of said operating arm from the outside of said member.

16. The structure of claim 15, the web of said member being formed to provide an opening therethrough, and the working face of said cam being adapted to extend through said opening to engage said band.

PAUL G. HAGENBUCH.
RAYMOND I. STRICKLAND.

REFERENCES CITED

The following references are of record in the file of this patent:

UNITED STATES PATENTS

| Number | Name | Date |
|---|---|---|
| 359,468 | Peirce | Mar. 15, 1887 |
| 2,338,819 | Mayne et al. | Jan. 11, 1944 |

FOREIGN PATENTS

| Number | Country | Date |
|---|---|---|
| 831,340 | France | June 7, 1938 |